United States Patent [19]

Harf

[11] 3,842,310

[45] Oct. 15, 1974

[54] MULTIPLYING INTEGRATOR CIRCUIT

[75] Inventor: Kenneth Gert Harf, Vestal, N.Y.

[73] Assignee: The Singer Company, Binghamton, N.Y.

[22] Filed: Nov. 20, 1972

[21] Appl. No.: 308,248

Related U.S. Application Data

[63] Continuation-in-part of Ser. No. 130,076, April 1, 1971, abandoned.

[52] U.S. Cl. .................................. 307/228, 315/24

[51] Int. Cl. .......................................... H01j 29/70

[58] Field of Search......... 315/27 R, 27 TD, 27 GD, 315/24, 18

[56] References Cited

UNITED STATES PATENTS

| | | | |
|---|---|---|---|
| 3,501,669 | 3/1970 | Henderson | 315/24 |
| 3,517,252 | 6/1970 | Williams | 315/27 GD |
| 3,714,501 | 1/1973 | Erickson | 315/27 GD |
| 3,725,726 | 4/1973 | West | 315/27 GD |

*Primary Examiner*—Maynard R. Wilbur
*Assistant Examiner*—J. M. Potenza
*Attorney, Agent, or Firm*—James C. Kesterson; Leonard Weiss

[57] ABSTRACT

A voltage proportional to a power of the vertical deflection of the beam of a raster swept CRT is applied to the input of an integrator circuit. The integrator circuit is reset in response to a horizontal sync pulse provided by a sync generator whereby a product voltage proportional to the product of the power of the vertical deflection and the horizontal deflection of the beam is provided. Successive integrator circuits may be cascaded to provide voltages proportional to the product of powers of the vertical and horizontal deflections.

6 Claims, 5 Drawing Figures

MULTIPLYING INTEGRATOR CIRCUIT

This is a continuation-in-part of the application having Ser. No. 130,076 filed on Apr. 1, 1971, now abandoned.

BACKGROUND OF THE INVENTION

1. Field of the Invention

This invention relates to cathode ray tube displays and more particularly to apparatus for providing a raster on a cathode ray tube.

2. Description of the Prior Art

In providing an image on the face of a cathode ray tube (CRT), typically the beam thereof is deflected to trace an array of evenly spaced horizontal lines from left to right across the face. The array of lines is referred to in the art as a raster. Rasters are usually comprised of more than 500 lines. Therefore, the vertical deflection of the beam changes at a much lower rate than the horizontal deflection since the beam is deflected more than 500 times horizontally across the face for each vertical deflection from the top to the bottom of the face.

The first line of the raster is usually traced across the top of the face. Thereafter, during a horizontal retrace time, the beam is rapidly deflected to the left hand side of the face to a point slightly lower than the start of the first line, and the succeeding line is traced; succeedingly lower lines are traced in a similar manner. After the lowest line on the face is traced, the beam is deflected during a vertical retrace to the upper left hand side of the face, and the first line of another raster is traced. Typically, a sync generator provides a vertical sync pulse to initiate the trace of the first line of a raster and horizontal sync pulses to respectively initiate each of the other lines.

The horizontal and vertical deflection of the beam is usually in response to horizontal and vertical deflection currents respectively provided by a pair of deflection amplifiers to windings on a deflection yoke mounted on the neck of the CRT. The deflection currents are provided in response to proportional horizontal and vertical deflection voltages.

In most CRTs, a phenomena known in the art as pincushion distortion or geometry distortion is caused when the radius of curvature of the face is different from the radius of deflection of the beam (which occurs in almost all CRTs). The geometry distortion causes the deflection of the beam to be a non-linear function of the deflection voltages. In an invention disclosed in U.S. Pat. No. 3,422,306, a deflection circuit comprised of analog multipliers provides deflection voltages which are predistorted to compensate for the geometry distortion.

In one type of a visual system for a flight simulator, a plurality of CRTs are optically combined to provide a substantially spherical viewing surface. Viewing surfaces of this type are disclosed by McGlasson in U.S. Pat. No. 3,659,920 and by McCoy in U.S. Pat. No. 3,697,681. In providing a raster on the spherical viewing surface, both of the deflection voltages have a nonlinear relationship to the position of the beam of the face of the CRT. Heretofore, rasters on the spherical viewing surface have been provided by complex deflection circuits comprised of analog multipliers.

SUMMARY OF THE INVENTION

An object of the present invention is to provide a product signal which is proportional to the product of the values of two input signals.

Another object of the present invention is to provide a raster on a viewing surface where a beam thereon traces each horizontal raster line at a desired horizontal rate where the vertical deflection of the beam from the top line to the bottom line changes at a desired vertical rate.

According to the present invention, an integrator provides a product signal in proportion to the integral of an input signal which remains substantially unchanged during the time between sync pulses provided by a sync generator, said integrator being reset to provide a known product signal in response to a sync pulse.

The present invention is especially suited for providing voltages proportional to powers of the vertical deflection, powers of the horizontal deflection and products of powers of the horizontal and vertical deflection of the beam of a raster swept cathode ray tube. The powers and the products of the powers are provided by integrators thereby obviating the need for analog multipliers.

The foregoing and other objects, features and advantages of the present invention will become more apparent in the light of the following detailed description of a preferred embodiment thereof as illustrated in the accompanying drawing.

DESCRIPTION OF THE PREFERRED EMBODIMENT

It is well known that when integrating a variable, the result is a function of the limits of the integration. One aspect of the present invention is predicated upon a constant or a slowly changing function having a time integral substantially equal to the product of the value of the function during the integration and the difference of the limits of the integration. It should be understood that the function is substantially constant during the integration. This aspect of the predication is in accordance with a first relationship which is given as:

$$\int_{T_A}^{T_A+\tau} F(T_{A,B})dt = F(T_{A,B})\int_{T_A}^{T_A+\tau} dt = F(T_{A,B})\tau$$

for $$T_B > \tau > T_A$$

where $T_A$ is the time when the integration is started, $T_B$ is the time when the integration is ended;

$\tau$ is the elapsed time from the time, $T_A$;

$t$ is the variable, time; and

F ($T_{A,B}$) is the value of a variable F ($t$), between the time, $T_A$, and the time, $T_B$.

Since the difference of the limits, $\tau$, may be considered as a variable, the first relationship provides a product of two variables (F ($t$) and $\tau$).

Another aspect of the present invention is predicated upon the successive time integration of a slowly changing function being proportional to successively higher powers of the difference of the limits of the integration. This aspect of the predication is in accordance with a second relationship which is given as:

$$\int_{T_A}^{T_A+\tau}\int_{T_A}^{T_A+\tau}\cdots\int_{T_A}^{T_A+\tau}F(T_{A,B})d^nt$$
$$=F(T_{A,B})\int_{T_A}^{T_A+\tau}\cdots\int_{T_A}^{T_A+\tau}d^nt$$
$$=F(T_{A,B})\frac{\tau n}{n!}$$

where $n$ is the number of successive integrations.

Therefore, the second relationship provides a product of two variables (F ($t$) and $\tau n$). In accordance with the present invention, integrator circuits provide voltages which are respectively proportional to the products of two variables. In the preferred embodiment, a plurality of such product voltages are fed to a pair of deflection amplifiers of a raster swept CRT display. In response thereto, the beam of the CRT is vertically deflected at a desired rate from the top line to the bottom line of the raster. Additionally, the beam is horizontally deflected along each line of the raster at a desired rate. The beam traces a multiplicity of horizontal lines for each vertical deflection whereby the vertical deflection is substantially unchanged during the horizontal deflection of the beam along a single line.

Figure 1:
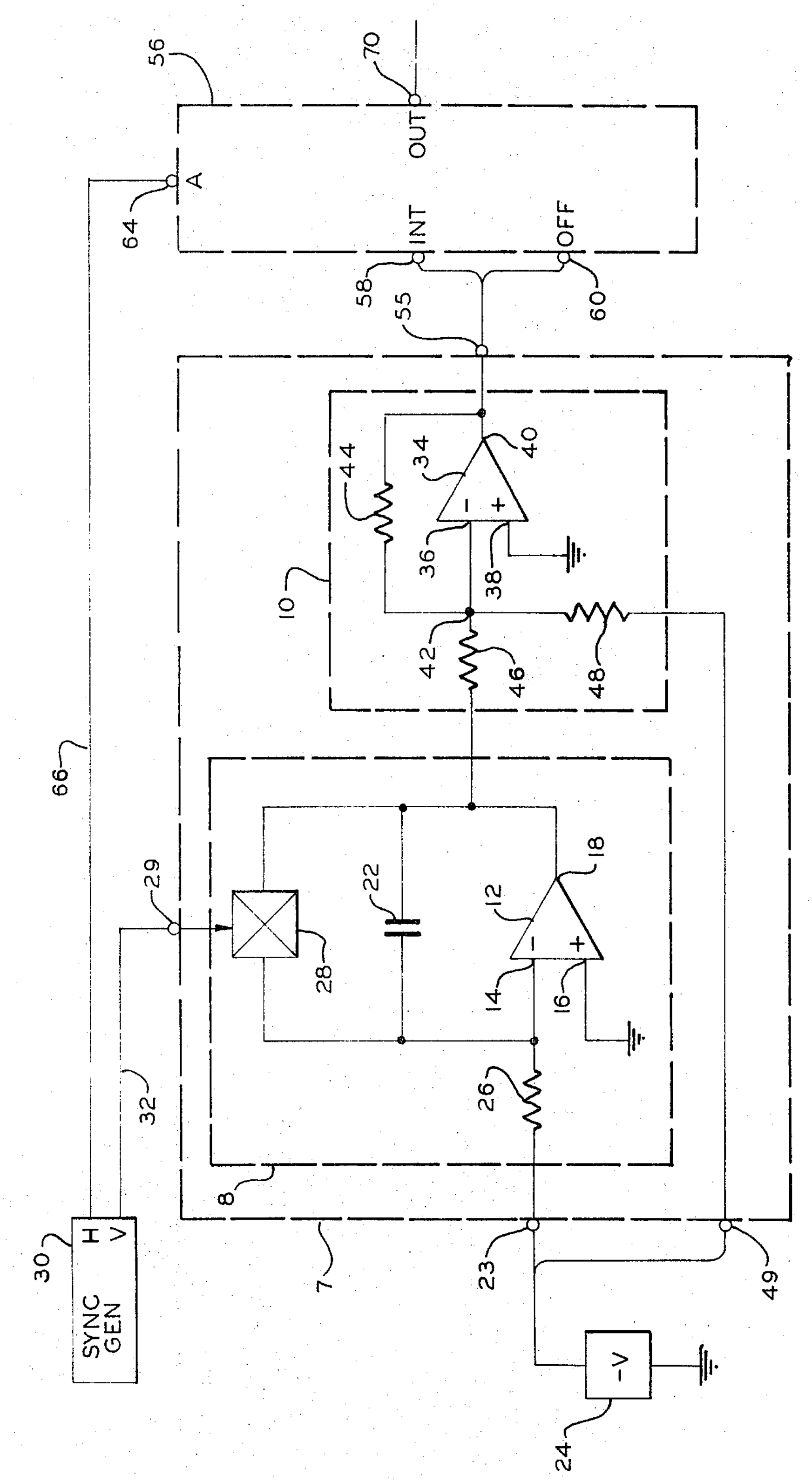
FIG. 1 is a schematic block diagram of a circuit for providing a product voltage proportional to the product of the horizontal and vertical deflections of a beam on a raster-swept CRT.

Referring now to FIG. 1, an integrate and offset circuit 7 is comprised of an integrator circuit 8 and an offset circuit 10. The integrator circuit 8 includes an operation amplifier 12 of the type which has an inverting input 14, a non-inverting input 16, and an amplifier output 18. Operational amplifiers of this type are well known in the art. The input 16 is connected to ground and the input 14 is connected to a summing junction 20. The junction 20 is connected to the output 18 and an integrator input terminal 23 of the circuit 7 through a capacitor 22 and an input summing resistor 26, respectively. The terminal 23 is connected to a negative DC voltage source 24 (—V) which provides a constant negative DC source voltage.

Connected across the output 18 and the junction 20 is a switch 28 with an actuation input thereof connected to an actuation input terminal 29 of the circuit 7. The terminal 29 is also connected to a sync generator 30 through a signal line 32 whereby vertical sync pulses are provided to the switch 28. In response to a vertical sync pulse, the switch 28 closes thereby connecting the output 18 to the summing junction 20; in the absence of a vertical sync pulse, the switch 28 is open. The switch 28 may be of the type comprised of a FET or any other suitable type.

As is known to those skilled in the art, the inverting and non-inverting inputs of an operational amplifier are always substantially at the same voltage. Accordingly, the inputs 14, 16 are at ground whereby the current through the resistor 26 has a constant value which is equal to the DC source voltage divided by the resistance of the resistor 26.

Another well known characteristic of operational amplifiers is that substantially no current flows into (or from) an input thereof. Accordingly, the constant current which flows through the resistor 26 also flows through the capacitor 22 (when the switch 28 is open). Since the voltage across a capacitor is proportional to the time integral of the current therethrough, an integral voltage which is proportional to the integral of the constant current is provided at the output 18. Since the time integral of a constant is a ramp, the constant current causes the integral voltage to have the waveshape of a ramp.

Figure 2:
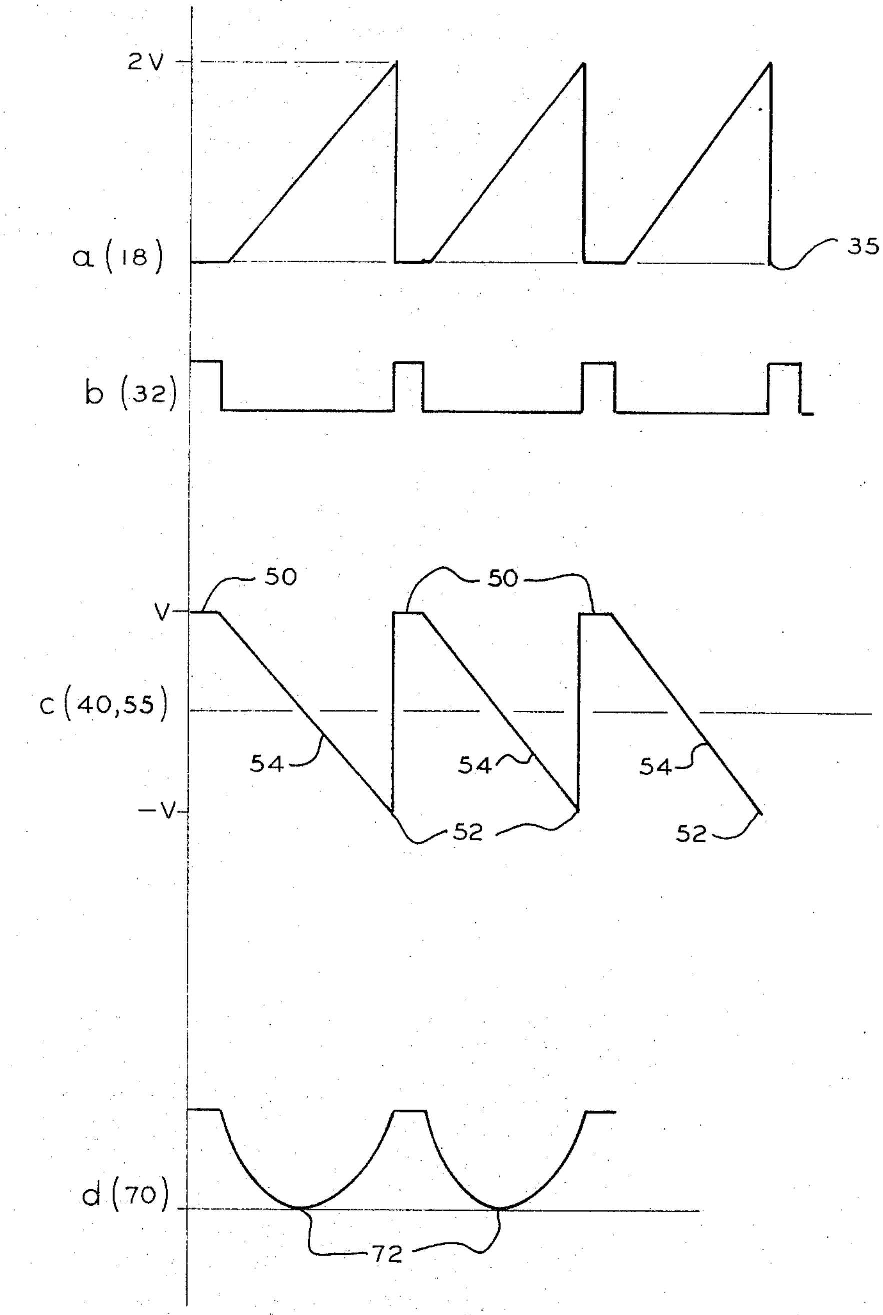
FIG. 2 is an illustration of the different signal relationships, all on a common time base, for the circuitry illustrated in FIG. 1.

The closing of the switch 28 causes the output 18 to have a voltage equal to the voltage at the junction 20 (ground) whereby the integrator 8 is reset to provide zero volts at the output 18. Accordingly, the vertical sync pulses cause the output 18 to provide a train of ramp voltage pulses which increase from ground. Illustration a, FIG. 2 is a waveform representative of the voltage provided at the output 18. The maximum voltage of the ramp pulses is represented by peak points 33 (2V) and ground is represented by a line 35. The maximum voltage is double the DC source voltage (—V) and of opposite polarity therefrom.

Illustration b, FIG. 2 is a waveform representative of the vertical sync pulses. When a raster is traced by the beam of a CRT (not shown) which is deflected from the top to the bottom line at a constant rate in response to the vertical sync pulses provided by the generator 30, a point on the waveform of illustration a, FIG. 2 is a representative of the vertical deflection of the beam.

On most CRTs, the vertical deflection of the beam is measured with respect to a horizontal line passing midway between the top and the bottom of the face. The offset circuit 10 (FIG. 1) provides a vertical voltage which has positive and negative values proportional to the respective deflections of the beam from the horizontal midway line. The vertical voltage is provided by an operational amplifier 34 (similar to the operational amplifier 12) which has an inverting input 36, a noninverting input 38 and an amplifier output 40. The input 38 is connected to ground and the input 36 is connected to a summing junction 42. The junction 42 is connected to the output 40, output 18, and an offset input terminal 49 of the circuit 7 through a feedback resistor 44 and input summing resistors 46, 48, respectively. The terminal 49 is connected to the source 24 whereby the DC source voltage (—V) causes an offset current through the resistor 48. The resistors 44, 48 have equal resistances each having half the resistance of the resistor 46.

Since the junction 42 is substantially at ground potential, no current flows through the resistor 46 when ground is provided at the output 18 (represented by the line 35 of illustration *a*, FIG. 2) whereby the current through the resistor 44 is equal to the offset current. Since the resistors 44, 48 are equal, when no current flows through the resistor 46, the voltage at the output 40 is equal in magnitude to, but opposite polarity from, the DC source voltage (−V).

Because the current through the resistor 44 is equal to the sum of the currents flowing through the resistors 46, 48, during times when the voltage at the output 18 is a maximum (represented by the points 33 of illustration a, FIG. 2), the voltage provided at the output 40 (FIG. 1) is equal in magnitude to and of the same polarity as the DC source voltage (−V). Therefore, in response to the voltage at the output 18 and the DC source voltage, a sawtooth voltage having a waveform as represented in illustration c, FIG. 2 is provided at the output 40. The offset circuit 10 (FIG. 1) offsets the ramp voltage pulses whereby a sawtooth voltage of zero is representative of the vertical deflection being at the horizontal midway line. Accordingly, lines 50 (illustration c, FIG. 2) and points 52 are respectively representative of the vertical deflection of the beam to the top and the bottom of the face of the CRT; lines 54 are respectively representative of the beam being traced from the top to the bottom of the face.

In a similar manner, a voltage representative of the horizontal deflection of the beam is provided at the output 40 by providing horizontal sync pulses at the terminal 29.

It should be understood that the voltage along any of the lines 54 is in accordance with an integral relationship which is given as:

$$Y(t)=V-2V\int_{T_1}^{t} d\lambda;\ T_1<t<T_2$$

$$=V-2V(t-T_1)=V[1\text{-}2(t-T_1)]$$

where

Y ($t$) is the voltage represented by the line 54;

V is the magnitude of the voltage provided by the source 24;

λ is the variable of integration;

$t$ is the variable, time;

$T_1$ is the time at the start of a raster; and $T_2$ is time at the end of the raster.

It should also be understood that the term, $[1-2(t-T_1)]$, is proportional to the vertical deflection of the beam on the face of the CRT. Therefore, in accordance with the first relationship, the circuit 7 provides a product voltage proportional to the product of a slowly changing function (the DC source voltage (−V), which is a constant) and the vertical deflection.

The output 40 is connected via an output terminal 55 of the circuit 7 to an integrate and offset circuit 56 (similar to the circuit 7) at integrator and offset input terminals 58, 60 thereof. An actuation input terminal 64 of the circuit 56 is connected to the generator 30 through a signal line 68 whereby horizontal sync pulses are provided to the circuit 56. Since the product voltage provided by the circuit 7 (which changes in accordance with the vertical deflection) is substantially unchanged during the deflection along a single horizontal line, the circuit 56 provides at an output terminal 70 thereof a product voltage which is proportional to the product of the horizontal and vertical deflections.

Figure 3:
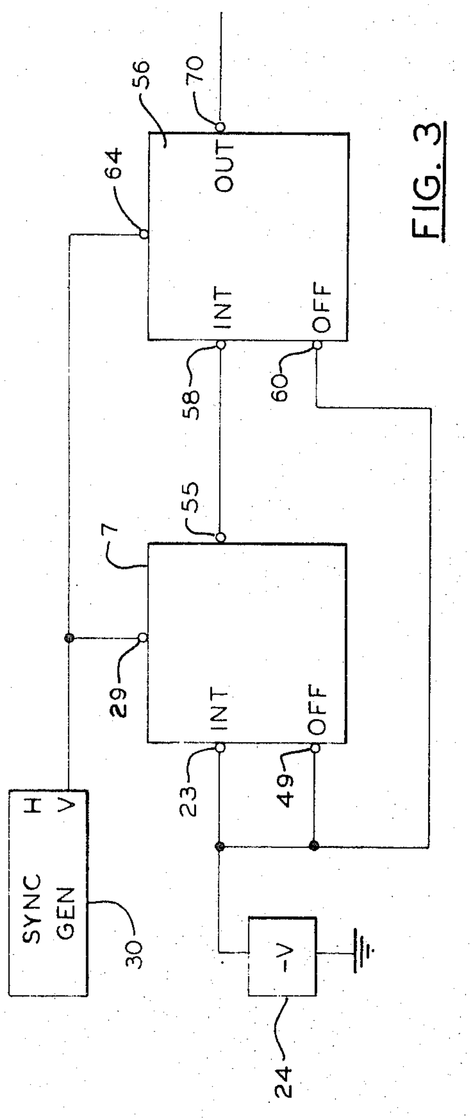
FIG. 3 is a block diagram of a circuit which provides a voltage proportional to the square of the vertical deflection of the beam of a raster-swept CRT.

Referring now to FIG. 3, the circuits 7, 56 comprise a circuit for providing a product voltage proportional to the product of the square of the vertical deflection and a slowly changing voltage (the DC source voltage (−V)). The actuation input terminals 29, 64 are connected to the sync generator 30 whereby the vertical sync pulses are provided to the circuits 7, 56. The offset terminals 49, 60 and the integrator input terminal 23 are all connected to the source 24 and the output terminal 55 is connected to the integrator input terminal 58.

As explained hereinbefore, in response to the vertical sync pulses and the DC source voltage (−V), an integrate and offset circuit provides a sawtooth voltage (illustration c, FIG. 2). In accordance with the second relationship, the circuit 56 provides at the terminal 70 a parabolic product voltage (the integral of the sawtooth voltage) which is proportional to the square of the vertical deflection. Illustration d, FIG. 2 is a waveform representative of the parabolic product voltage. The amplitude of the sawtooth voltage, and hence the amplitude of the parabolic product voltage, is proportional to the voltage provided at the terminal 23 (the DC source voltage (−V)).

When a term of a product is proportional to the square of the vertical deflection, the term is zero during the deflection along the horizontal midway line (because the vertical deflection is zero along the horizontal midway line). The DC source voltage (−V) at the terminal 60 offsets the parabolic product voltage to zero volts when the vertical deflection is on the horizontal midway line. Points 72 (illustration d, FIG. 2) are representative of the parabolic product voltage being zero.

It should be understood that when the horizontal sync pulses are applied to the actuation inputs 29, 64, the circuits 7, 56 comprise a circuit for providing a product voltage proportional to the product of square of the horizontal deflection and the DC source voltage (−V).

Figure 4:
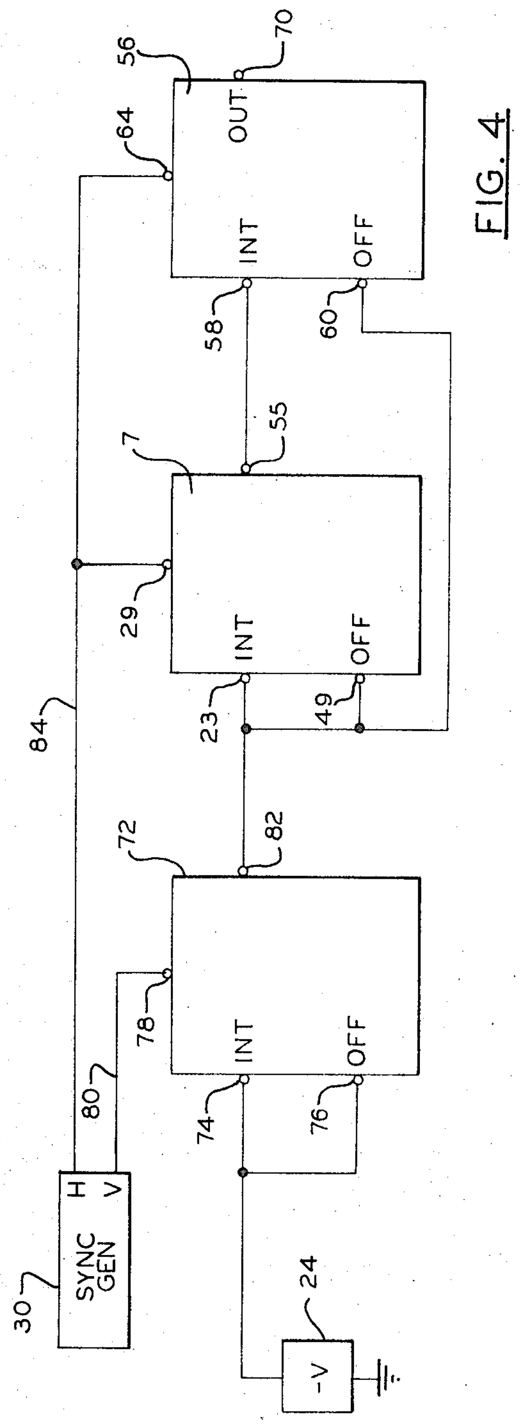
FIG. 4 is a block diagram of a circuit for providing a voltage proportional to the product of the vertical deflection and the square of the horizontal deflection of the beam of a raster-swept CRT.

Referring now to FIG. 4, an integrate and offset circuit 72 (similar to the circuit 7) and the circuits 7, 56 comprise a circuit for providing a product voltage proportional to the product of the vertical and the square of the horizontal deflections. The circuit 72 has an integrator input terminal 74 and an offset input terminal 76 both connected to the source 24. An actuation input terminal 78 is connected to the sync generator 30 through a signal line 80 whereby the vertical sync pulses are provided to the circuit 72.

An output terminal 82 of the circuit 72 is connected to the input terminals 23, 49 of the circuit 7 and the offset input terminal 60 of the circuit 56. For reasons described hereinbefore, the output terminal 82 provides a product voltage proportional to the vertical deflection.

The actuation input terminals 29, 64 are both connected to the sync generator 30 through a signal line 84 whereby the horizontal sync pulses are provided to the circuits 7, 56. The output terminal 55 of the circuit 7 is connected to the integrator input terminal 58 of the circuit 56 whereby the circuits 7, 56 are connected in a configuration similar to that of FIG. 3 and the circuits 72, 7 are connected in a configuration similar to that of FIG. 1. Accordingly, the output terminal 55 provides a product voltage proportional to the product of the horizontal and vertical deflections. In accordance with the second relationship, the output terminal 70 provides a product voltage proportional to the product of the vertical and the square of the horizontal deflections.

Figure 5:
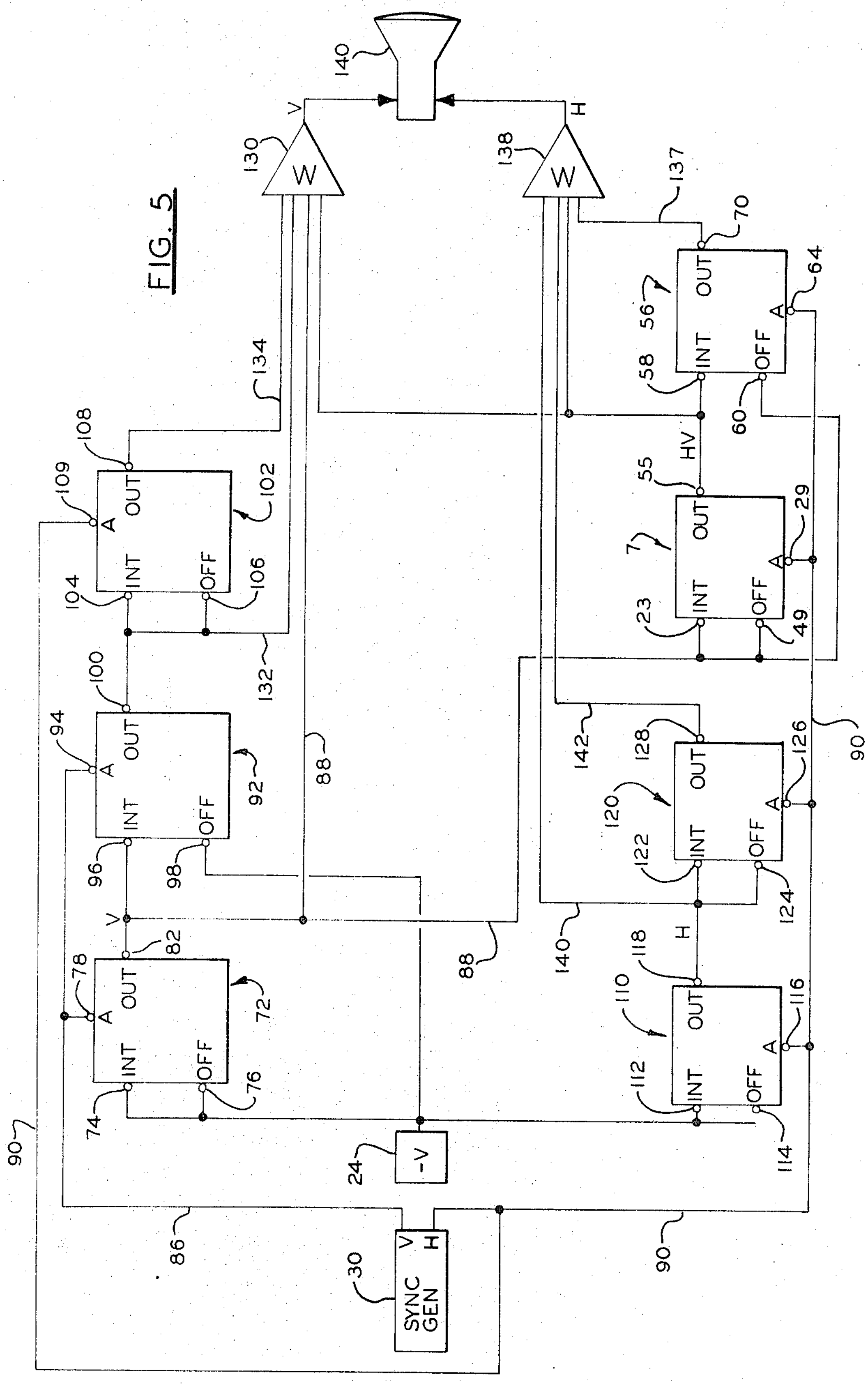
FIG. 5 is a block diagram of the preferred embodiment of the present invention.

Referring now to FIG. 5, a circuit for providing deflection currents for the cathode ray tube is comprised of circuits 72, 7, 56 which are connected in the configuration of FIG. 4. Accordingly, the actuation input 78 is connected to the sync generator 30 through a signal line 86 whereby the vertical sync pulses are provided to the circuit 72. The terminal 82 of the circuit 72 is connected to the input terminals 23, 49 (circuit 7) and the offset input terminal 60 (circuit 56) through a signal line 88. The actuation input terminals 29, 64 are connected through a signal line 90 to the sync generator 30 whereby the horizontal sync pulses are provided to the circuits 7, 56. The output terminal 55 (circuit 7) is connected to the integrator input terminal 58 (circuit 56). Accordingly, the circuits 72, 7, 56, respectively provide product voltages proportional to the vertical deflection, the product of the horizontal and the vertical deflections and the product of the vertical and the square of the horizontal deflections.

An integrate and offset circuit 92 (similar to the circuit 7) has an actuation input 94 connected to the line 86 whereby the vertical sync pulses are provided thereto. An integrator input 96 and an offset output 98 of the circuit 92 are respectively connected to the terminal 82 and the source 24. Accordingly, the circuits 72, 92 are in the configuration of FIG. 3 whereby a product voltage proportional to the square of the vertical deflection is provided at an output terminal 100 of the circuit 92.

The output terminal 100 is connected to an integrate and offset circuit 102 (similar to the circuit 7) at an integrate input terminal 104 and an offset input terminal 106 thereof. An actuate input terminal 108 of the circuit 104 is connected to the sync generator 30 through the line 90 whereby the horizontal sync pulses are provided thereto. Since the vertical deflection remains substantially unchanged during the deflection along a single horizontal line, the square of the vertical deflection also remains substantially unchanged. Therefore, the circuit 102 provides at an output terminal 108 thereof a product voltage proportional to the product of the square of the vertical deflection and the horizontal deflection.

An integrate and offset circuit 110 (similar to the circuit 7) has an integrator input terminal 112 and an offset input terminal 114 thereof both connected to the source 24. An actuation input terminal 116 of the circuit 110 is connected to the line 90 whereby the horizontal sync pulses are provided thereto. Accordingly, the circuit 110 provides a product voltage at an output terminal 118 thereof which is proportional to the horizontal deflection of the beam.

The output terminal 118 is connected to an integrate and offset circuit 120 (similar to the circuit 7) at an integrator input terminal 122 and an offset input terminal 124 thereof. An actuation input 126 is connected to the line 90 whereby the horizontal sync pulses are provided to the circuit 120. Accordingly, the circuits 110, 120 are in the configuration of FIG. 2 whereby a product voltage proportional to the square of the horizontal deflection is provided at an output terminal 128 of the circuit 120.

The output terminals 82, 100, 108, 55 are respectively connected to inputs of a summing amplifier 130 through the signal line 88 and signal lines 132, 134, 136. The summing amplifier 130 is of the type which provides components of current in desired proportions to the plurality of product voltages respectively applied at the inputs thereof. Therefore, the amplifier 130 provides a vertical deflection current in accordance with the plurality of product voltages. Typically, the largest component of the vertical deflection current is provided in response to the product voltage provided by the circuit 72.

The output terminals 118, 128 are respctively connected to a summing amplifier 138 through signal lines 140, 142. The output terminals 55, 70 are respectively connected to the amplifier 138 through the line 36 and a signal line 137, respectively. The amplifier 138 is similar to the amplifier 130 described hereinbefore and provides components of current in desired proportions to the plurality of product voltages respectively applied at the inputs thereof. Therefore, the amplifier 138 provides a horizontal deflection current in accordance with the plurality of product voltages. Typically, the largest component of the horizontal deflection current is provided in response to the product voltage provided by the circuit 110.

The outputs of the amplifiers 130, 138 are respectively connected to deflection coils in a display 140 whereby the beam on the CRT of the display is deflected to provide rasters having lines which are swept at a desired horizontal rate where the vertical deflection of the beam from the top line to the bottom line changes at a desired vertical rate.

It should be understood that in a spherical display, the product voltages cause the beam of the CRT to trace a raster where the beam is deflected at a constant rate from the top line to the bottom line. Additionally, the beam is deflected along each line of the raster at a constant rate. The product voltages also eliminate the geometry distortion of the CRT.

Thus there has been shown apparatus for providing product voltages proportional to the product of two voltages where one voltage remains substantially unchanged during an integration.

Although the invention has been shown and described with respect to a preferred embodiment thereof it should be understood by those skilled in the art that various changes and omissions in the form and detail thereof may be made therein without departing from the spirit and the scope of the invention.

Having thus described a typical embodiment of my invention, that which I claim as new and desire to secure by letters patent of the United States is:

1. Included in apparatus for continuously generating a raster on the viewing surface of a CRT wherein first and second repetitive sweep signals direct the electron beam of said CRT along two mutually perpendicular dimensions of said viewing surface such that for each raster generated a plurality of spaced parallel lines are traced across said viewing surface, said parallel lines being traced in response to a series of said first sweep signals and said spacing of said lines being in response to a single one of said second sweep signals; circuitry for providing a correction signal suitable for adjusting selected ones of the sweep signals, said correction signal being proportional to the product of a selected uncorrected sweep signal and a selected power of a selected uncorrected sweep signal comprising:

pulse means for providing sync pulses, each sync pulse corresponding to a single sweep of one of said repetitive sweep signals;

means for providing an input signal proportional to a selected one of an uncorrected repetitive sweep signal raised to a selected power; and integrating means for integrating said input signal during the time period between two successive sync pulses for producing an output signal from said integrating means corresponding to the product of said input signal and an uncorrected sweep signal for which said sync pulses correspond, said output signal suitable for use as a correction signal for selected sweep signals.

2. Apparatus of claim 1 wherein said sweep signal raised to a selected power is that sweep signal mutually perpendicular to that sweep signal for which said series of sync pulses corresponds.

3. Apparatus of claim 1 wherein said input signal is proportional to said sweep signal raised at least to the second power.

4. The apparatus of claim 3 wherein said sweep signal raised to said at least second power is that sweep signal mutually perpendicular to that sweep signal for which said series of sync pulses corresponds.

5. Included in apparatus for continuously generating a raster on the viewing surface of a CRT wherein first and second repetitive sweep signals direct the electron beam of said CRT along two mutually perpendicular dimensions of said viewing surface such that for each raster generated a plurality of spaced parallel lines are traced across said viewing surface, said parallel lines being traced in response to a series of said first sweep signals and said spacing of said lines being in response to a single one of said second sweep signals; circuitry for providing a correction signal suitable for adjusting selected ones of the sweep signals, said correction signals being proportional to the product of an uncorrected first sweep signal and a selected power of an uncorrected second sweep signal comprising:

pulse means for providing sync pulses, each sync pulse corresponding to a single sweep of said first repetitive sweep signal;

means for providing an input signal proportional to said uncorrected second sweep signal raised to a selected power; and integrating means for integrating said input signal during the time period between two successive sync pulses for producing an output signal from said integrating means corresponding to the product of said input signal and said uncorrected first sweep signal, said output signal suitable for use as a correction signal for selected sweep signals.

6. Apparatus of claim 5 wherein said input signal is proportional to said sweep signal raised at least to the second power.

* * * * *